United States Patent
Yu et al.

(10) Patent No.: US 9,024,612 B2
(45) Date of Patent: May 5, 2015

(54) BUCK CONVERTER HAVING PULSE SKIPPING MODE AND RELATED METHOD OF OPERATION

(71) Applicant: Samsung Electronics Co., Ltd., Suwon-Si, Gyeonggi-Do (KR)

(72) Inventors: Jinhyuck Yu, Hwaseong-si (KR); Minkyu Song, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 199 days.

(21) Appl. No.: 13/710,614

(22) Filed: Dec. 11, 2012

(65) Prior Publication Data

US 2013/0154598 A1    Jun. 20, 2013

(30) Foreign Application Priority Data

Dec. 19, 2011    (KR) .......................... 10-2011-0137397

(51) Int. Cl.
*H02M 3/156* (2006.01)
*G05F 1/618* (2006.01)

(52) U.S. Cl.
CPC ...................................... *G05F 1/618* (2013.01)

(58) Field of Classification Search
USPC .................. 323/282, 284, 285, 351
See application file for complete search history.

(56) References Cited

U.S. PATENT DOCUMENTS

| | | | |
|---|---|---|---|
| 6,396,252 B1 | 5/2002 | Culpepper et al. | |
| 7,245,113 B2 | 7/2007 | Chen et al. | |
| 2008/0224674 A1 | 9/2008 | Hasegawa | |
| 2009/0128113 A1 | 5/2009 | Ryoo | |
| 2009/0237049 A1 | 9/2009 | Hachiya et al. | |
| 2010/0237841 A1 | 9/2010 | Matsuo et al. | |
| 2010/0283442 A1 | 11/2010 | Nakashima | |
| 2010/0315055 A1 | 12/2010 | Miyazaki | |
| 2011/0050185 A1 | 3/2011 | Notman et al. | |
| 2011/0089925 A1* | 4/2011 | Ishida et al. | 323/285 |

FOREIGN PATENT DOCUMENTS

| | | |
|---|---|---|
| JP | 2006-166667 A | 6/2006 |
| JP | 2008-136307 A | 6/2008 |
| JP | 2009-225642 A | 10/2009 |
| JP | 2010-183723 A | 8/2010 |
| KR | 1020090050318 A | 5/2009 |
| KR | 1020090084998 A | 8/2009 |

* cited by examiner

*Primary Examiner* — Gary L Laxton
(74) *Attorney, Agent, or Firm* — Volentine & Whitt, PLLC

(57) ABSTRACT

A buck converter comprises a switching unit configured to control a connection between a power terminal and a load terminal, a PWM controller configured to provide a PWM signal to the switching unit, and a control signal generator configured to generate a first control signal and a second control signal based on a current flowing to the load terminal, wherein the first control signal controls generation of the PWM signal and the second control signal controls a pulse width of the PWM signal.

16 Claims, 8 Drawing Sheets

BUCK CONVERTER HAVING PULSE SKIPPING MODE AND RELATED METHOD OF OPERATION

CROSS-REFERENCE TO RELATED APPLICATIONS

This application claims priority under 35 U.S.C §119 to Korean Patent Application No. 10-2011-0137397 filed Dec. 19, 2011, the subject matter of which is hereby incorporated by reference.

BACKGROUND OF THE INVENTION

The inventive concept relates generally to electronic circuit technologies. More particularly, certain embodiments of the inventive concept relate to a buck converter, or step-down converter, and related methods of operation.

A buck converter, or step-down converter, is a device used to convert a first voltage into a second voltage of lower magnitude. One of the more common applications of a buck converter is the conversion of a power supply voltage into a lower voltage used to drive an electrical load in a circuit.

FIG. 1 is a block diagram of a conventional bulk converter 10. Referring to FIG. 1, bulk converter 10 comprises a power providing unit 11, a switching unit 12, a current sensor 14, a feedback unit 15, a pulse width modulation (PWM) controller 16, a switch driver 17, and a current detector 18. Bulk converter 10 transfers power $v_{IN}$ from power providing unit 11 to load 13 via switching unit 12. Switch driver 17 controls switching unit 12 based on a combination of inputs produced by the operation of current sensor 14, feedback unit 15, PWM controller 16, and current detector 18, as shown in FIG. 1.

Where load 13 is a relatively small load, current may be lost in a continuous conduction mode (CCM). Accordingly, pulse skipping may be used to prevent this current loss and to improve efficiency. With the pulse skipping, a pulse width modulation (PWM) switching cycle may be skipped according to a power supplied to load 13. That is, the pulse skipping may be used to prevent power from being supplied unnecessarily, Unfortunately, however, the pulse skipping tends to lower the efficiency of the buck converter.

SUMMARY OF THE INVENTION

In one embodiment of the inventive concept, a buck converter comprises a switching unit configured to control a connection between a power terminal and a load terminal, a PWM controller configured to provide a PWM signal to the switching unit, and a control signal generator configured to generate a first control signal and a second control signal based on a current flowing to the load terminal, wherein the first control signal controls generation of the PWM signal and the second control signal controls a pulse width of the PWM signal.

In another embodiment of the inventive concept, a method of controlling a buck converter having a pulse skipping mode comprises controlling a PWM controller to provide a PWM signal based on a current flowing to a load terminal, expanding or narrowing a pulse width of the PWM signal, and selectively connecting a power terminal and the load terminal based on the PWM signal of which a pulse width is expanded or narrowed.

In still another embodiment of the inventive concept, a buck converter comprises a switching unit configured to control a connection between a power terminal and a load terminal, a PWM controller configured to provide a PWM signal to the switching unit, and a control signal generator configured to generate a first control signal and a second control signal based on a current flowing to the load terminal, wherein the control signal generator generates the first control signal with a first value to cause the PWM controller to provide the PWM signal to the switching unit, and generates the first control signal with a second value to prevent the PWM controller from providing the PWM signal to the switching unit, and wherein the control signal generator generates the second control signal to control a duty cycle of the PWM signal.

These and other embodiments of the inventive concept can potentially provide more efficient operation compared with conventional buck converter technologies.

BRIEF DESCRIPTION OF THE DRAWINGS

The drawings illustrate selected embodiments of the inventive concept. In the drawings, like reference numbers indicate like features, and the relative dimensions of certain features may be exaggerated for clarity of illustration.

DETAILED DESCRIPTION

Figure 1:
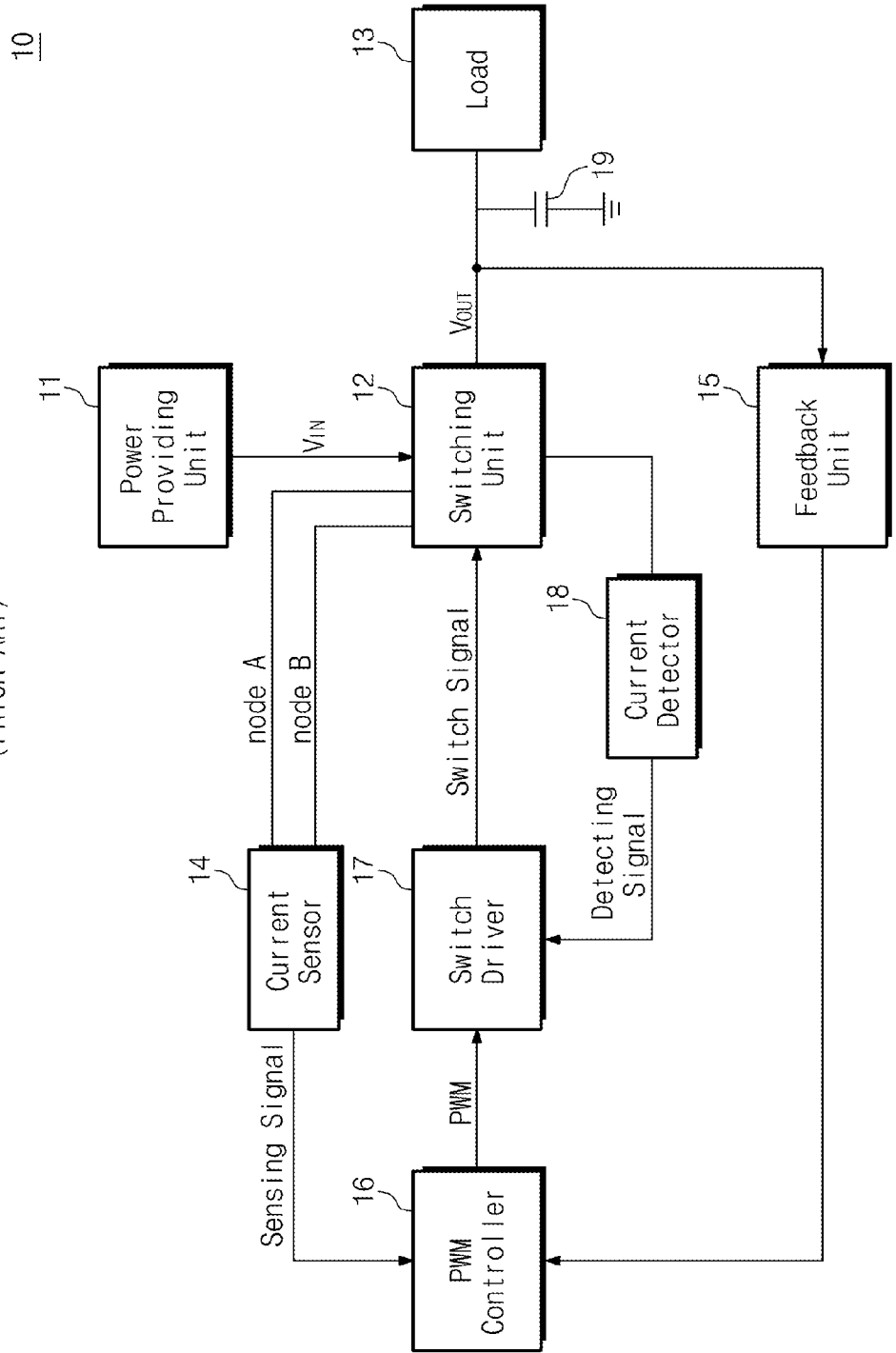
FIG. 1 is a block diagram of a conventional bulk converter.

Embodiments of the inventive concept are described below with reference to the accompanying drawings. These embodiments are presented as teaching examples and should not be construed to limit the scope of the inventive concept.

In the description that follows, the terms first, second, third etc. may be used to describe various features, but the described features should not be limited by these terms. Rather, these terms are used merely to distinguish between different features. Thus, a first feature could be termed a second feature and vice versa without materially altering the relevant teachings.

Spatially relative terms, such as "beneath", "below", "lower", "under", "above", "upper" and the like, may be used herein for ease of description to describe one feature's relationship to another feature as illustrated in the drawings. The spatially relative terms are intended to encompass different orientations of the device in use or operation in addition to the orientation depicted in the drawings. For example, if the device shown in the drawings is turned over, features described as "below" or "beneath" or "under" other features would then be oriented "above" the other features. Thus, the terms "below" and "under" can encompass both an orientation of above and below. The device may be otherwise oriented (rotated 90 degrees or at other orientations) and the spatially relative descriptors used herein interpreted accordingly. In addition, where a layer is referred to as being "between" two layers, it can be the only layer between the two layers, or one or more intervening layers may also be present.

The terminology used herein is for the purpose of describing particular embodiments only and is not intended to limit the inventive concept. The singular forms "a", "an" and "the" are intended to encompass the plural forms as well, unless the context clearly indicates otherwise. The terms "comprises" and/or "comprising," where used in this specification, indicate the presence of stated features but do not preclude the presence or addition of other features. The term "and/or" indicates any and all combinations of one or more of the associated listed items.

Where a feature is referred to as being "on", "connected to", "coupled to", or "adjacent to" another feature, it can be directly on, connected, coupled, or adjacent to the other feature, or intervening features may be present. In contrast, where a feature is referred to as being "directly on," "directly connected to", "directly coupled to", or "immediately adjacent to" another feature, there are no intervening features present.

Unless otherwise defined, all terms (including technical and scientific terms) used herein have the same meaning as commonly understood by one of ordinary skill in the art. Terms such as those defined in commonly used dictionaries should be interpreted as having a meaning that is consistent with their meaning in the context of the relevant art and/or this description and will not be interpreted in an idealized or overly formal sense unless expressly so defined herein.

Figure 2:
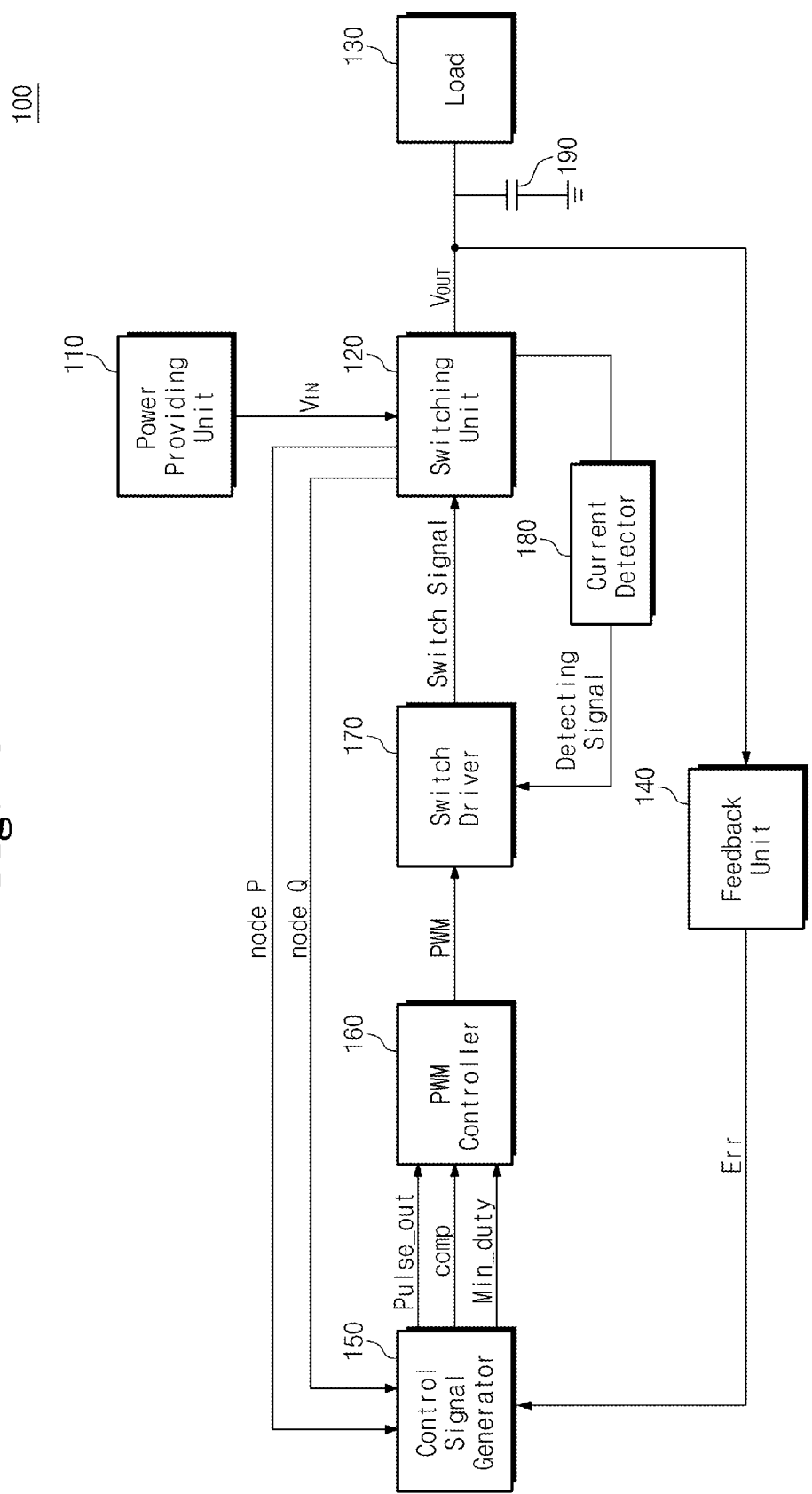
FIG. 2 is a block diagram of a buck converter according to an embodiment of the inventive concept.

FIG. 2 is a block diagram of a buck converter 100 according to an embodiment of the inventive concept.

Referring to FIG. 2, buck converter 100 comprises a power providing unit 110, a switching unit 120, a feedback unit 140, a control signal generator 150, a PWM controller 160, a switch driver 170, a current detector 180, and a capacitor 190.

Power providing unit 110 supplies power $V_{IN}$ via a power terminal. Switching unit 120 controls a connection between the power terminal and a load terminal. Where the power terminal and the load terminal are connected by switching unit 120, power is supplied to a load 130 from power providing unit 110. Where the power terminal and the load terminal are disconnected by switching unit 120, the supply of power to load 130 is interrupted.

Feedback unit 140 provides a feedback signal Err based on an output voltage $V_{OUT}$ of the load terminal. Control signal generator 150 provides control signals Pulse_out, comp, and Min_duty based on feedback signal Err and current flowing to the load terminal. A first control signal "comp" is used to control generation of a PWM signal PWM provided from PWM controller 160 according to a current flowing to the load terminal. A second control signal Min_duty is used to expand a pulse width of PWM signal PWM that is controlled by the first signal comp. Third signal Pulse_out provides a constant period for a clock.

PWM controller 160 provides PWM signal PWM to switching unit 120 in response to control signals Pulse_out, comp, and Min_duty. Examples of control signal generator 150 and PWM controller 160 are described in further detail below.

Current detector 180 detects current of a specific node of switching unit 120, and it provides a detecting signal to switch driver 170 as the detection result. In some embodiments, current detector 180 detects a current flowing from switching unit 120 to ground.

Switch driver 170 provides a switch signal to drive switches within switching unit 120 in response to the detecting signal and the PWM signal. In some embodiments, switch driver 170 senses a current flowing to a ground from switching unit 120 via the detecting signal. In some embodiments, switch driver 170 selectively provides the switch signal where a current flowing to a ground from switching unit 120 becomes '0'.

Where the power supplied to the buck converter is greater than the power consumed by load 130, buck converter 100 operates in a pulse skipping mode. In the skipping mode, load 130 is driven by an inductor for a relatively longer time. Thus, an output voltage may be maintained by transferring much energy to load 130 from the inductor.

Output voltage $V_{OUT}$ may be lowered where load 130 is relatively small. Where output voltage $V_{OUT}$ reaches a low-voltage regulation threshold value, a new switching cycle may start. The inductor may be recharged, and then output voltage $V_{OUT}$ may be recovered by power supplied from the power terminal. For a small load, the efficiency of buck converter 100 may be lowered due to switching. Thus, the efficiency of buck converter 100 may be improved by reducing a switching number for recharging of the inductor.

In buck converter 100, a pulse width of PWM signal PWM may be expanded in response to second control Min_duty. As the pulse width is expanded, a level of a power charged at an inductor per switching cycle may increase. In addition, a number of switching operations necessary to fully charge the inductor may decrease. Thus, in the pulse skipping mode, the number of switching operations of switching unit 120 may decrease. Because the power consumed by switching is reduced, the power efficiency of buck converter 100 may be improved.

Figure 3:
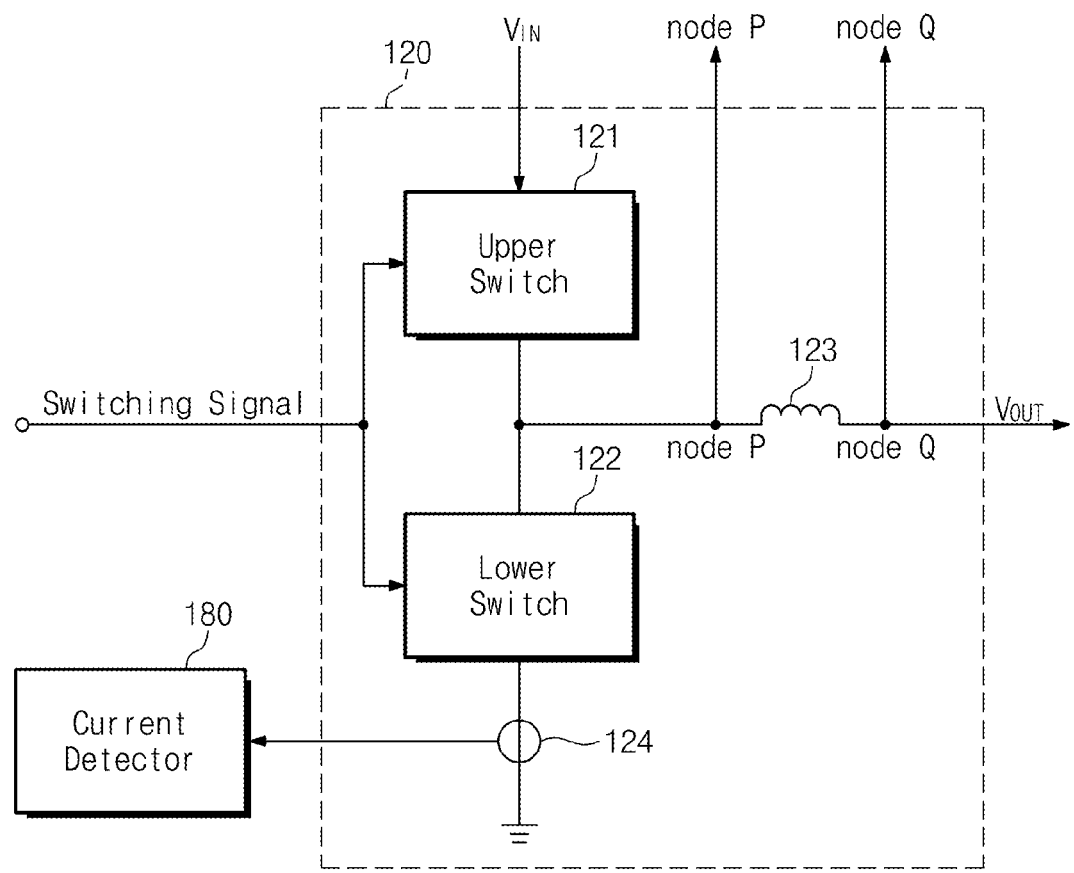
FIG. 3 is a block diagram of a switching unit in FIG. 2 according to an embodiment of the inventive concept.

FIG. 3 is a block diagram of switching unit 120 of FIG. 2 according to an embodiment of the inventive concept.

Referring to FIG. 3, switching unit 120 comprises a first switch 121, a second switch 122, and a coil 123. First switch 121 and second switch 122 are controlled by a switching signal. First switch 121 and second switch 122 function in a complementary manner. In particular, first switch 121 is turned on by the switching signal, while second switch 122 is turned off by the switching signal. However, where buck converter 100 enters the pulse skipping mode, first and second switches 121 and 122 are turned off at the same time.

First switch 121 has one end connected to a power terminal supplied with power supply voltage $V_{IN}$ and the other end connected to a node P. Second switch 122 has one end connected to node P and the other end connected to ground.

One end of coil 123 is connected to node P, and the other end is connected to a node Q. Node Q is connected to a load terminal.

Where the switching signal is low, first switch 121 is turned on and second switch 122 is turned off. Power is supplied to coil 123 from the power terminal via first switch 121. The power is supplied until a voltage of node P reaches voltage $V_{IN}$ of the power terminal. Coil 123 is charged by the supplied power, and power charged at coil 123 is supplied to the load terminal.

Where the switching signal transitions from a low level to a high level, first switch 121 is turned off and second switch 122 is turned on. For a small load, where second switch 122 is turned on, power charged at coil 123 is discharged via second switch 122. Current discharged via second switch 122 is referred to as a reverse current, which has a negative impact on device performance. Accordingly, pulse skipping may be used to prevent the reverse current. In the pulse skipping mode, first and second switches 121 and 122 are turned off at the same time.

Switching unit 120 provides node voltage values of both nodes P and Q of coil 123 and a value of a current flowing from second switch 122 to ground. In addition, switching unit 120 controls connection between the power terminal and the load terminal.

Figure 4:
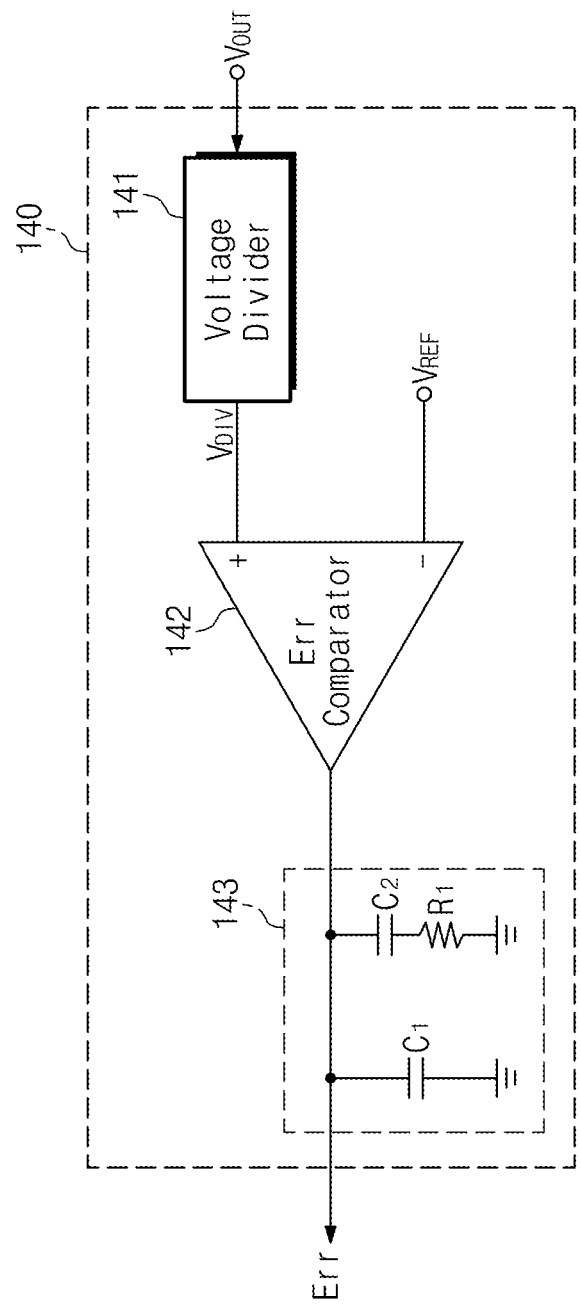
FIG. 4 is a block diagram of a feedback unit in FIG. 2 according to an embodiment of the inventive concept.

FIG. 4 is a block diagram of feedback unit 140 according to an embodiment of the inventive concept.

Referring to FIG. 4, feedback unit 140 comprises a voltage divider 141, a voltage comparator 142, and a filter 143. Voltage divider 141 divides a voltage $\backslash T_{our}$ of a load terminal and it generates a division voltage $V_{DIV}$ as a result of the division. Voltage divider 141 typically comprises a plurality of resistors.

Voltage comparator 142 compares a feedback reference voltage $V_{REF}$ and division voltage $V_{DIV}$. Voltage comparator 142 outputs a result obtained by subtracting the feedback reference voltage $V_{REF}$ from division voltage $V_{DIV}$ as a feedback signal Err. The feedback reference voltage $V_{REF}$ is a fixed voltage. Feedback signal Err indicates a current voltage level of a load terminal. That is, a level of feedback signal Err increases in proportion to an increase in a voltage of the load terminal.

Filter 143 eliminates noise from feedback signal Err. For example, in some embodiments, filter 143 may operate as a low pass filter, and a noise component may be discharged to a ground via filter 143.

Figure 5:
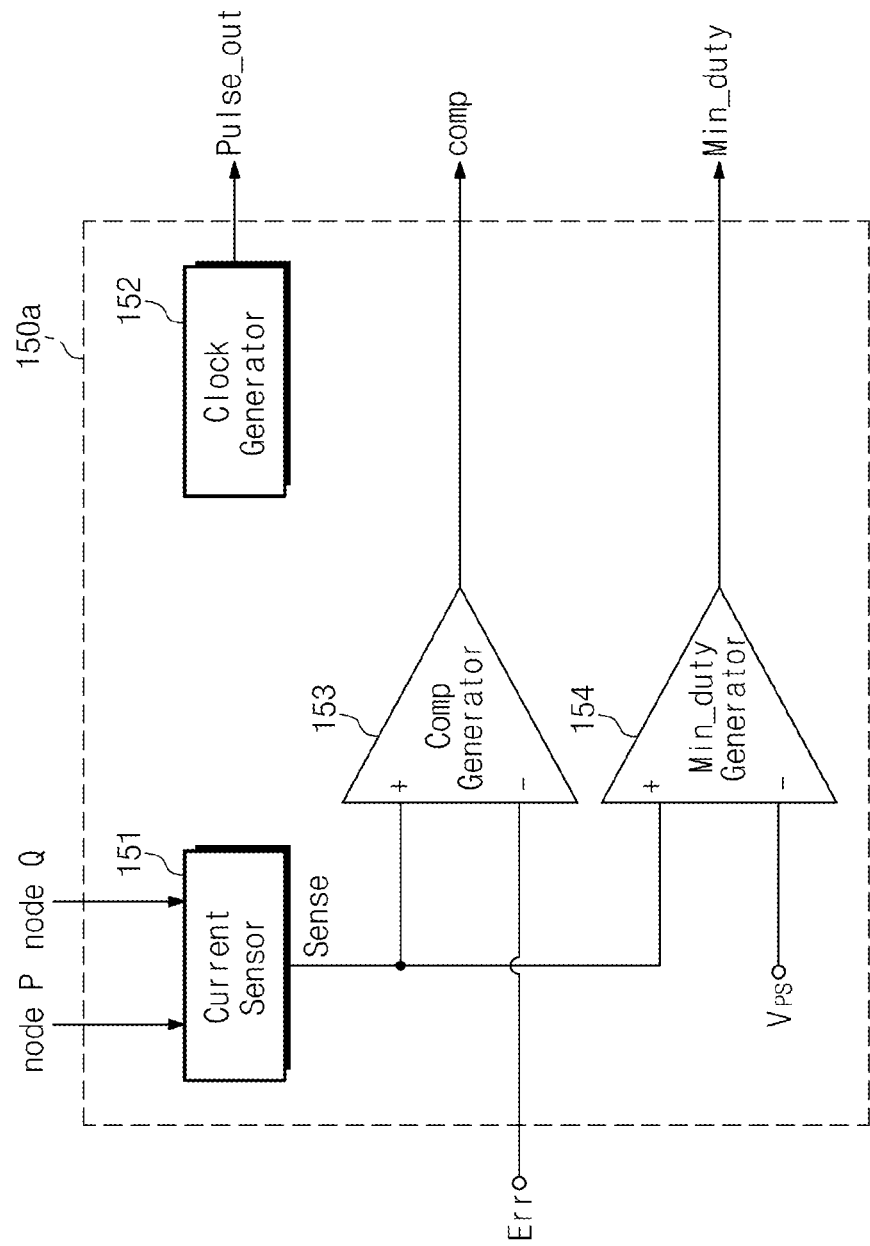
FIG. 5 is a control signal generator according to an embodiment of the inventive concept.
Figure 6:
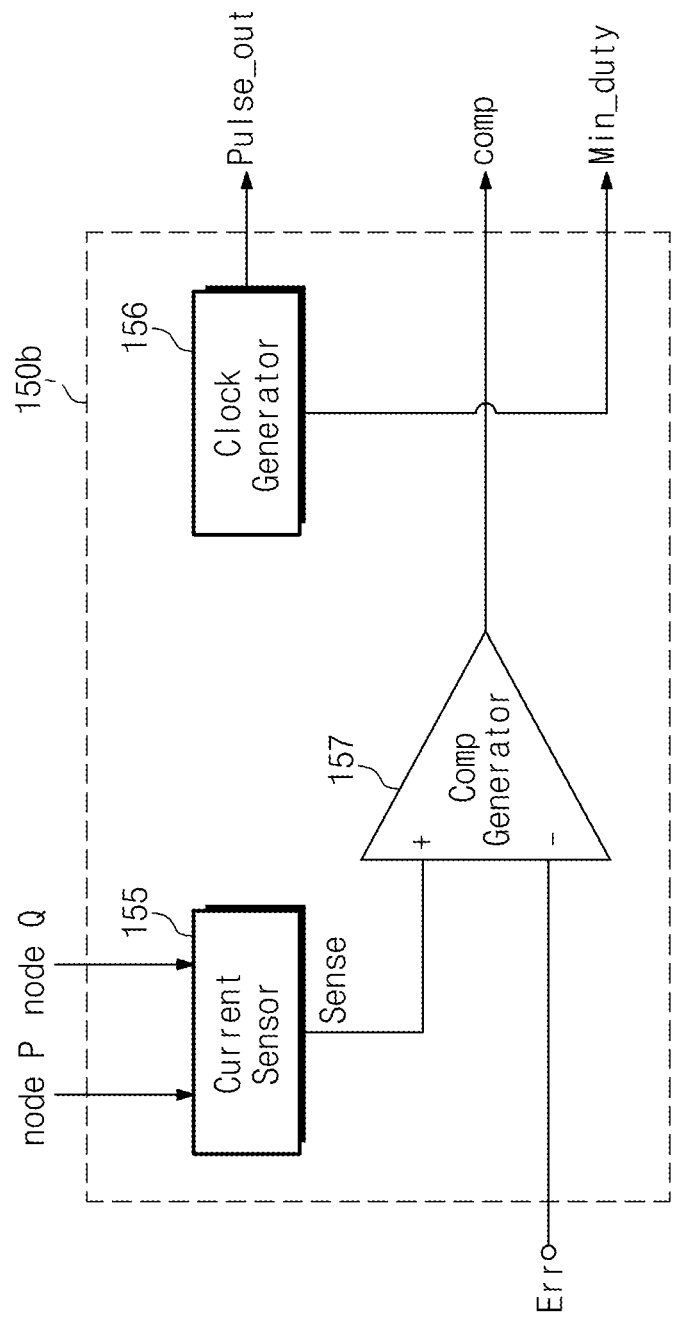
FIG. 6 is a control signal generator according to another embodiment of the inventive concept.

FIGS. 5 and 6 are diagrams illustrating alternative embodiments of control signal generator 150 of FIG. 2. To distinguish between these different embodiments, the embodiment of FIG. 5 will be referred to as control signal generator 150a, and the embodiment of FIG. 6 will be referred to as control signal generator 150b.

Referring to FIG. 5, control signal generator 150a comprises a current sensor 151, a clock generator 152, a first comparator 153, and a second comparator 154.

Current sensor 151 generates a sense signal based on voltages of nodes P and Q. Current sensor 151 typically generates the sense signal by adding a ramp signal to voltages of node P or node Q.

Clock generator 152 generates a clock signal having a constant period. The clock signal may be provided as third control signal Pulse_out.

First comparator 153 provides a first control signal comp based on the sense signal and feedback signal Err. First comparator 153 generates the first control signal comp based on a result obtained by subtracting feedback signal Err from the sense signal. For example, if the sense signal is larger than feedback signal Err, the first control signal comp transitions to a high level. On the other hand, if the sense signal is smaller than feedback signal Err, the first control signal comp transitions to a low level.

Second comparator 154 provides a second control signal Min_duty based on the sense signal and a reference signal $V_{PS}$. In some embodiments, second comparator 154 generates second control signal Min_duty based on a result obtained by subtracting reference signal $V_{PS}$ from the sense signal. For example, if the sense signal is larger than reference signal $V_{PS}$, second control signal Min_duty transitions to a high level. On the other hand, if the sense signal is smaller than reference signal $V_{PS}$, second control signal Min_duty transitions to a low level. Reference signal $V_{PS}$ is typically used to determine a pulse width of second control signal Min_duty. A duty cycle of the second control signal Min_duty may be varied according to the sense signal. In other words, the period and pulse width of this signal may be variable.

Referring to FIG. 6, control signal generator 150b comprises a current sensor 155, a clock generator 156, and a comparator 157. Current sensor 155 and comparator 157 cam be implemented similar to current sensor 151 and comparator 153 of FIG. 5, so a description of these features will be omitted in order to avoid redundancy.

Clock generator 156 generates a second control signal Min_duty having a predetermined value. In this case, second control signal Min_duty has a substantially constant period.

Figure 7:
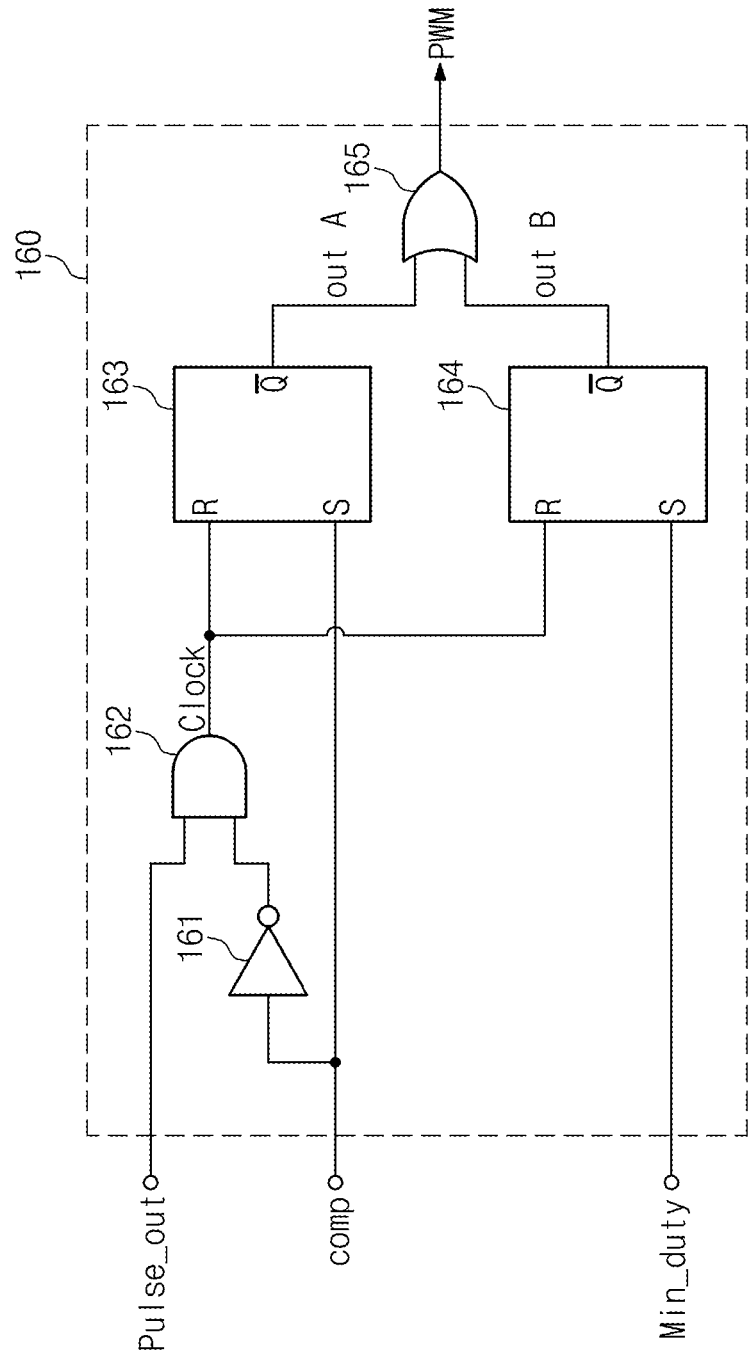
FIG. 7 is a block diagram of a PWM controller in FIG. 2 according to an embodiment of the inventive concept.

FIG. 7 is a block diagram of PWM controller 160 of FIG. 2 according to an embodiment of the inventive concept.

Referring to FIG. 7, PWM controller 160 comprises an inverter 161, an AND gate 162, a first latch 163, a second latch 164, and an OR gate 165.

Inverter 161 invert a first control signal comp. AND gate 162 provides a clock CLK in response to an output of inverter 161 and a third control signal Pulse_out.

First latch 163 latches the first control signal comp to output an inverted version of the first control signal as a first output A. Second latch 164 latches the second control signal Min_duty to output an inverted version of the second control signal as a second output B.

OR gate 165 provides a PWM signal PWM in response to the first and second outputs A and B. In PWM controller 160 of FIG. 7, where either of first and second outputs A and B is at a high level, PWM signal PWM transitions to a high level. That is, compared with a situation where PWM signal PWM is generated by the first control signal comp, the probability that PWM signal PWM becomes high may increase. Consequently, a pulse width of PWM signal PWM may be expanded by the second control signal Min_duty.

Figure 8:
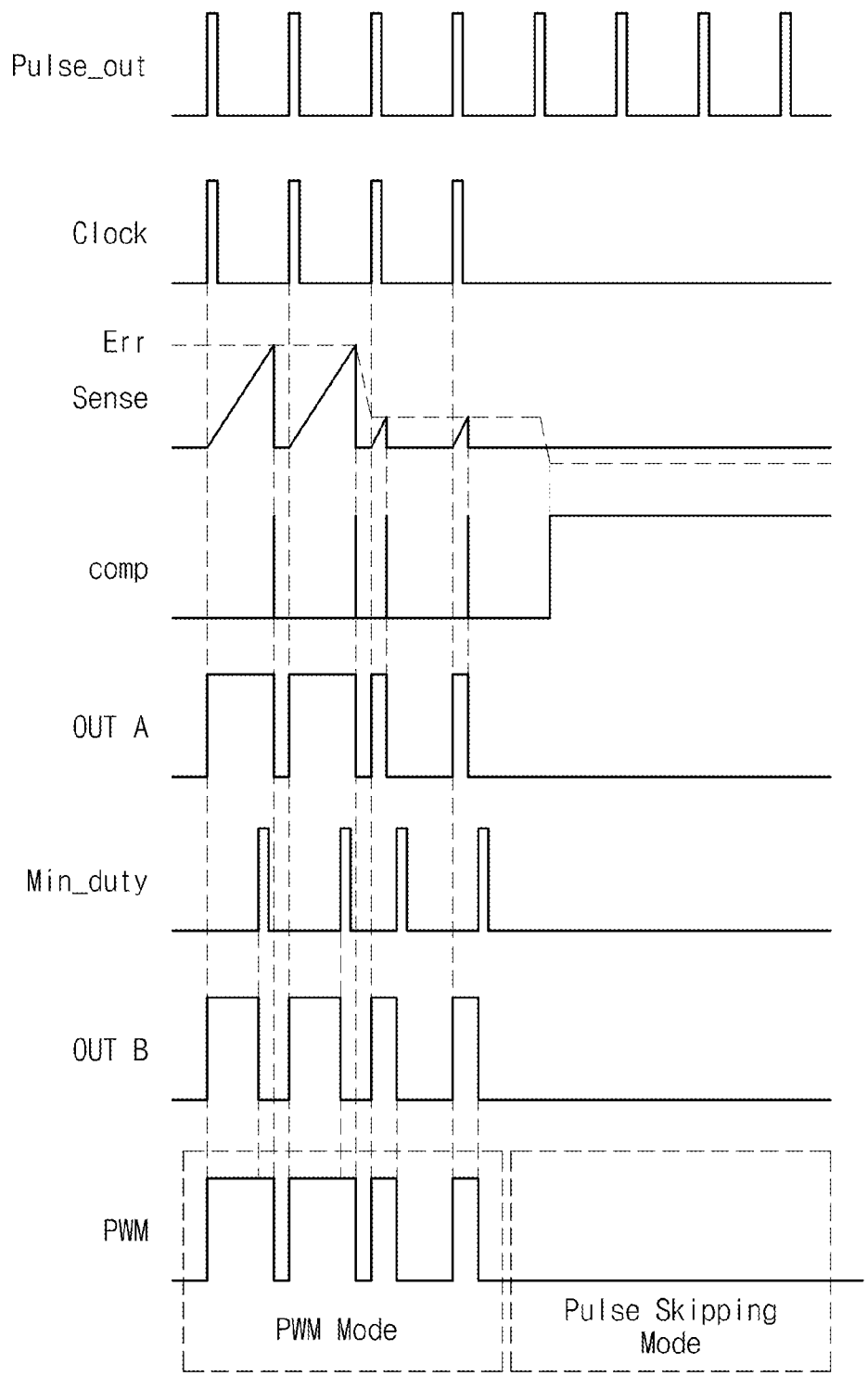
FIG. 8 is a timing diagram illustrating the operation of a buck converter according to an embodiment of the inventive concept.

FIG. 8 is a timing diagram illustrating the operation of buck converter 100 according to an embodiment of the inventive concept. For explanation purposes, it will be assumed that buck converter 100 comprises control signal generator 150 as illustrated in FIG. 5 and PWM controller 160 as illustrated in FIG. 7. Accordingly, current sensor 155 and feedback unit 140 provide a sense signal and feedback signal Err, respectively, and first comparator 153 generates first control signal comp based on the sense signal and feedback signal Err.

Referring to FIG. 8, the first control signal comp has a high level where the sense signal is greater than or equal to feedback signal Err. On the other hand, first control signal comp has a low level where the sense signal is smaller than feedback signal Err.

Second comparator 154 provides second control signal Min_duty. Second comparator 154 compares the sense signal to reference signal $V_{PS}$ to generate the second control signal Min_duty. Reference signal $V_{PS}$ can be determined according to a desired expansion width of a PWM signal PWM.

Clock generator 152 provides third control signal Pulse_out having a constant period of a clock. First to third signals comp, Min_duty, and Pulse_out are provided to PWM controller 160, and PWM controller 160 generates a PWM signal PWM based on first to third signals comp, Min_duty, and Pulse_out.

PWM controller 160 provides a clock by combining an inverted version of the first control signal comp and the third control signal Pulse_out. The clock has a low level during a period where the first control signal comp is maintained at a high level. This period is a pulse skipping mode period, as described in further detail below.

An RS latch operation is performed using the clock and the first control signal comp. An inverted version of a latched result may be provided as a first output A.

An RS latch operation is performed using the clock and the second control signal Min_duty. An inverted version of a latched result is provided as a second output B. Timing of the first and second outputs A and B is illustrated in FIG. 8.

PWM controller 160 generates PWM signal PWM based on the first and second outputs A and B. Where either of the first and second outputs A and B is at a high level, PWM signal PWM may assume a high level, as illustrated in FIG. 8.

Low levels of the first and second outputs A and B are maintained during a period where the clock is at a low level. Thus, the buck converter operate in a pulse skipping mode during a period where PWM signal PWM has a low level.

As indicated by the foregoing, PWM controller 160 outputs PWM signal PWM having a high level where either one of first and second outputs A and B transitions to a high level. Thus, compared with a situation where PWM signal PWM is controlled by the first control signal comp, a pulse width of PWM signal PWM may be expanded.

This expansion of the pulse width may produce an increase in the amount of a power charged in an inductor per switching cycle. In addition, it may also reduce the number of switching operations needed to fully charge the inductor. Moreover, because the amount of power consumed during switching is reduced, the power efficiency of the buck converter may be improved.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the inventive concept. Accordingly, all such modifications are intended to be included within the scope of the inventive concept as defined in the claims.

What is claimed is:

1. A buck converter having a pulse skipping mode, comprising:
    a switching unit configured to control a connection between a power terminal and a load terminal;
    a PWM controller configured to provide a PWM signal to the switching unit;
    a control signal generator configured to generate a first control signal and a second control signal based on a current flowing to the load terminal and comprising a clock generator that provides a constant period of a clock as a third control signal and a comparator that generates the first control signal based on the current flowing to the load terminal and a feedback signal, wherein the first control signal controls generation of the PWM signal and the second control signal controls a pulse width of the PWM signal; and
    a feedback unit configured to provide the feedback signal based on a voltage of the load terminal.

2. The buck converter of claim 1, wherein the switching unit comprises:
    a first switch that turns on or off according to the PWM signal; and
    a second switch that operates in a complementary manner to the first switch.

3. The buck converter of claim 2, wherein the first switch comprises one end connected to the power terminal and another end connected to the second switch.

4. The buck converter of claim 1, wherein the second control signal is generated by the clock generator.

5. The buck converter of claim 4, wherein the second control signal has a constant period.

6. The buck converter of claim 5, wherein the PWM controller comprises:
    a first latch configured to latch the first control signal based on the third control signal; and
    a second latch configured to latch the second control signal based on the third control signal,
    wherein the PWM signal has a high level an output of the first or second latches is at a high level.

7. The buck converter of claim 1, wherein the second control signal is generated based on a current flowing to the load terminal and a reference voltage.

8. The buck converter of claim 1, wherein the buck converter is operated in a pulse skipping mode.

9. A method of controlling a buck converter having a pulse skipping mode, comprising:
    controlling a PWM controller to provide a PWM signal based on a current flowing to a load terminal;
    expanding or narrowing a pulse width of the PWM signal;
    selectively connecting a power terminal and the load terminal based on the PWM signal of which a pulse width is expanded or narrowed; and
    generating a clock signal having a constant period to control the PWM signal using a clock generator,
    wherein the PWM controller comprises a first latch and a second latch respectively operated by the clock signal, and an operator configured to perform an OR operation on respective outputs of the first and second latches to generate the PWM signal.

10. The method of claim 9, wherein the buck converter comprises a switching unit, and the method further comprises:
    turning on a first switch of the switching unit when the PWM signal is at a low or high level; and
    turning on a second switch of the switching unit in a manner complementary to that of the first switch.

11. The method of claim 9, further comprising:
    providing a feedback signal to adjust the PWM signal based on a voltage of the load terminal.

12. A buck converter, comprising:
    a switching unit configured to control a connection between a power terminal and a load terminal;
    a PWM controller configured to provide a PWM signal to the switching unit; and
    a control signal generator configured to generate a first control signal and a second control signal based on a current flowing to the load terminal, wherein the control signal generator generates the first control signal with a first value to cause the PWM controller to provide the PWM signal to the switching unit, and generates the first control signal with a second value to prevent the PWM controller from providing the PWM signal to the switching unit, and wherein the control signal generator generates the second control signal to control a duty cycle of the PWM signal.

13. The buck converter of claim 12, wherein the control signal generator generates the first control signal with the second value during a pulse skipping mode of the buck converter.

14. The buck converter of claim 12, wherein the switching unit comprises:
    a first switch that turns on or off according to the PWM signal; and
    a second switch that operates in a complementary manner to the first switch.

15. The buck converter of claim 14, wherein the first switch comprises one end connected to the power terminal and another end connected to the second switch.

16. The buck converter of claim 1, further comprising a feedback unit configured to provide a feedback signal based on a voltage of the load terminal, wherein the feedback signal is used to generate the first control signal.

* * * * *